(12) United States Patent
Agarwal et al.

(10) Patent No.: US 6,306,960 B1
(45) Date of Patent: *Oct. 23, 2001

(54) ARTICLES FORMED FROM FOAMABLE POLYPROPYLENE POLYMER

(75) Inventors: Pawan K. Agarwal, Houston; Aspy K. Mehta, Humble, both of TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/433,485

(22) Filed: Nov. 4, 1999

Related U.S. Application Data

(63) Continuation-in-part of application No. 09/293,656, filed on Apr. 16, 1999, now Pat. No. 6,207,750.
(60) Provisional application No. 60/085,317, filed on May 13, 1998.

(51) Int. Cl.[7] .............................. C08F 8/00; C08L 23/00; C08L 23/04
(52) U.S. Cl. ........................ 525/55; 525/191; 525/240; 521/134; 521/142
(58) Field of Search ................................ 525/191, 240, 525/55; 521/134, 142; 526/290

(56) References Cited

U.S. PATENT DOCUMENTS

| | | |
|---|---|---|
| 4,530,914 | 7/1985 | Ewen et al. . |
| 4,542,199 | 9/1985 | Kaminsky et al. . |
| 4,665,208 | 5/1987 | Welborn, Jr. et al. . |
| 4,701,432 | 10/1987 | Welborn, Jr. . |
| 4,769,910 | 9/1988 | Noon . |
| 4,808,561 | 2/1989 | Welborn, Jr. . |
| 4,849,487 | 7/1989 | Kaminsky et al. ................. 526/160 |
| 4,871,705 | 10/1989 | Hoel . |
| 4,874,734 | 10/1989 | Kioka et al. . |
| 4,908,463 | 3/1990 | Bottelberghe . |

(List continued on next page.)

FOREIGN PATENT DOCUMENTS

| | | |
|---|---|---|
| 2133181 | 3/1995 | (CA) . |
| 0 277 004 | 8/1988 | (EP) . |
| 0 279 586 B | 8/1988 | (EP) . |
| 0 279 863 B | 8/1988 | (EP) . |
| 0 354 893 B | 2/1990 | (EP) . |

(List continued on next page.)

OTHER PUBLICATIONS

Ferdinand R.W.P. Wild, et al., "ansa–Metallocene Derivatives—VII. Synthesis and Crystal Structure of a Chiral ansa–Zirconocene Derivative with Ethylene–Bridged Tetrahydroindenyl Ligands"—*Journal of Organometallic Chemicstry*, v.288, pp. 63–67, (1985).
Derwent Abstract for DE 196 22 083 A1, Dec. 4, 1997.
Derwent Abstract for EP 0 516 018 A2, Dec. 2, 1992.
Derwent Abstract for EP 0 702 030 A1, Mar. 20, 1996.
Derwent Abstract for EP 0 320 762 B1, Jun. 21, 1989.
Derwent Abstract of EP 0 549 900, Jul. 7, 1993.
Derwent Abstract of EP 0 576 970, Jan. 5, 1994.
"Termination of Polymer Chain Growth," Zeigler–Natta Catalysts and Polymerizations, J. Boor, Jr., pp. 244–260 (Academic Press 1979).

*Primary Examiner*—Nathan M. Nutter
(74) *Attorney, Agent, or Firm*—David J. Alexander; Kevin M. Faulkner

(57) ABSTRACT

This invention relates generally to articles formed from polypropylene polymer foams and desirably isotactic polypropylene polymer foams. The polypropylene polymers are obtained from metallocene catalysis. The polypropylene polymer has molecular weight distributions and densities that fall within broad ranges. The polypropylene polymer foam may be prepared in a multiple stage polymerization process using the same metallocene component in at least two stages.

12 Claims, 1 Drawing Sheet

U.S. PATENT DOCUMENTS

| | | |
|---|---|---|
| 4,921,825 | 5/1990 | Kioka et al. . |
| 4,923,833 | 5/1990 | Kioka et al. . |
| 4,924,018 | 5/1990 | Bottleberghe . |
| 4,933,403 | 6/1990 | Kaminsky et al. . |
| 4,937,299 | 6/1990 | Ewen et al. . |
| 4,952,540 | 8/1990 | Kioka et al. . |
| 4,968,827 | 11/1990 | Davis . |
| 5,017,714 | 5/1991 | Welborn, Jr. . |
| 5,026,798 | 6/1991 | Canich . |
| 5,057,475 | 10/1991 | Canich et al. . |
| 5,091,352 | 2/1992 | Kioka et al. . |
| 5,103,031 | 4/1992 | Smith, Jr. . |
| 5,120,867 | 6/1992 | Welborn, Jr. . |
| 5,145,819 | 9/1992 | Winter et al. . |
| 5,157,137 | 10/1992 | Sangokoya . |
| 5,198,401 | 3/1993 | Turner et al. . |
| 5,204,419 | 4/1993 | Tsutsui et al. . |
| 5,206,199 | 4/1993 | Kioka et al. . |
| 5,235,081 | 8/1993 | Sangokoya . |
| 5,239,022 | 8/1993 | Winter et al. . |
| 5,240,894 | 8/1993 | Burkhardt et al. . |
| 5,243,001 | 9/1993 | Winter et al. . |
| 5,248,801 | 9/1993 | Sangokoya . |
| 5,252,389 | 10/1993 | Schmidt et al. . |
| 5,276,208 | 1/1994 | Winter et al. . |
| 5,278,119 | 1/1994 | Turner et al. . |
| 5,280,074 | 1/1994 | Schreck et al. . |
| 5,296,434 | 3/1994 | Karl et al. . |
| 5,304,614 | 4/1994 | Winter et al. . |
| 5,308,815 | 5/1994 | Sangokoya . |
| 5,322,902 | 6/1994 | Schreck et al. . |
| 5,324,800 | 6/1994 | Welborn, Jr. et al. . |
| 5,329,032 | 7/1994 | Tran et al. . |
| 5,329,033 | 7/1994 | Spaleck et al. . |
| 5,346,925 | 9/1994 | Sugano et al. . |
| 5,350,723 | 9/1994 | Neithamer et al. . |
| 5,350,817 | 9/1994 | Winter et al. ............ 526/119 |
| 5,374,752 | 12/1994 | Winter et al. . |
| 5,391,790 | 2/1995 | Rohrmann et al. . |
| 5,407,884 | 4/1995 | Turner et al. . |
| 5,468,781 | 11/1995 | Sugano et al. ............ 521/60 |
| 5,483,002 | 1/1996 | Seelert et al. . |
| 5,483,014 | 1/1996 | Turner et al. . |
| 5,510,502 | 4/1996 | Sugano et al. . |
| 5,532,325 | 7/1996 | Oka et al. . |
| 5,605,936 | 2/1997 | DeNicola, Jr. et al. ............ 521/50.5 |
| 5,643,847 | 7/1997 | Walzer, Jr. . |
| 5,672,668 | 9/1997 | Winter et al. . |
| 5,714,427 | 2/1998 | Winter et al. ............ 502/117 |
| 6,174,930 * | 1/2001 | Agarwal et al. ............ 521/134 |

FOREIGN PATENT DOCUMENTS

| | | |
|---|---|---|
| 0 426 637 | 5/1991 | (EP) . |
| 0 495 375 | 7/1992 | (EP) . |
| 0 500 944 | 9/1992 | (EP) . |
| 0 507 876 | 10/1992 | (EP) . |
| 0 520 732 | 12/1992 | (EP) . |
| 0 551 277B | 7/1993 | (EP) . |
| 0 561 476 | 9/1993 | (EP) . |
| 0 570 982 | 11/1993 | (EP) . |
| 0 576 403 | 12/1993 | (EP) . |
| 0 594 218 | 4/1994 | (EP) . |
| 0 611 795 A1 | 8/1994 | (EP) . |
| 0 662 979 B | 7/1995 | (EP) . |
| 0 670 334 | 9/1995 | (EP) . |
| 0 672 689 | 9/1995 | (EP) . |
| 0 736 552 A2 | 10/1996 | (EP) . |
| WO 94/03506 | 2/1994 | (WO) . |
| WO 94/10180 | 5/1994 | (WO) . |
| WO 94/28034 | 12/1994 | (WO) . |
| WO 95/08285 | 3/1995 | (WO) . |
| WO 96/00243 | 1/1996 | (WO) . |
| WO 96/00245 | 1/1996 | (WO) . |
| WO 98/10016 | 3/1998 | (WO) . |
| WO 99/16797 | 4/1999 | (WO) . |

* cited by examiner

ARTICLES FORMED FROM FOAMABLE POLYPROPYLENE POLYMER

This application is a Continuation-in-Part of U.S. patent application Ser. No. 09/293,656 filed Apr. 16, 1999, now U.S. Pat. No. 6,207,750 which is a regular application of Provisional Application No. 60/085,317 filed May 13, 1998.

FIELD OF THE INVENTION

This invention relates generally to polypropylene polymers, their uses, and to methods of their production.

BACKGROUND

Among the three most versatile commodity plastics, which are polyethylene (PE), polystyrene (PS) and polypropylene (PP), polypropylene is considered to possess the most favorable properties profile of the three for a variety of applications. These applications include, for example, oriented and non-oriented films, textile fibers, nonwovens and a variety of injection molded parts. Comparing the properties, it is well known that polypropylene has a higher modulus and heat deflection temperature (HDT) than polyethylene. The higher the modulus and HDT, the more suited the polymer is for durable applications in the appliance and automotive segments. Additionally, because polypropylene is nonpolar, it resists degradation by common solvents, such as acids and alkalis. Compared to polystyrene, polypropylene is preferred in applications requiring good organoleptic performance, high barrier properties and the living hinge property. Finally, polypropylene blends well with a variety of other polymers, and in impact-modified form occupies a dominant position in the automotive industry in the areas of bumpers, side panels, floor mats, dashboards and instrument panels.

However, there exist some polymer applications where polypropylene is not the preferred plastic of choice. Examples of such polymer application areas include thermoforming and foaming. Foamed polymers find usage in automotive, marine, appliance and packaging applications because of their good insulating and structural properties at low added weight. Thermoforming is a popular fabricating mode that competes favorably with injection molding in the making of thin-walled containers. Polypropylene's deficiencies in foaming and thermoforming are believed to be related to its generally poor melt strength and rapid melt viscosity drop, poor sheet sag and comparatively slow crystallization kinetics. For example, to successfully foam an article formed from a polyolefin, it is desirable that the polyolefin selected for foaming possess high melt strength. With high melt strength, the bubble growth rate within the polyolefin can be controlled without premature bursting. Controlling bubble growth rate is also important for ensuring a uniform distribution of cell sizes, which leads to greater product uniformity. Additionally, broader polymer processing temperature windows are desirable so that when the polymer is used in an article forming process, the temperature variances along the process line are less disruptive to the fabrication of a quality product.

So that manufactures of plastic articles and the consuming public may more fully benefit from the use of polypropylene in a broader array of applications, further development and investigation is needed in the area of polypropylene compositions and methods of manufacturing. This is particularly so, as described above, when the article manufacturing process requires that the polymer be foamed.

SUMMARY OF THE INVENTION

Figure 1:
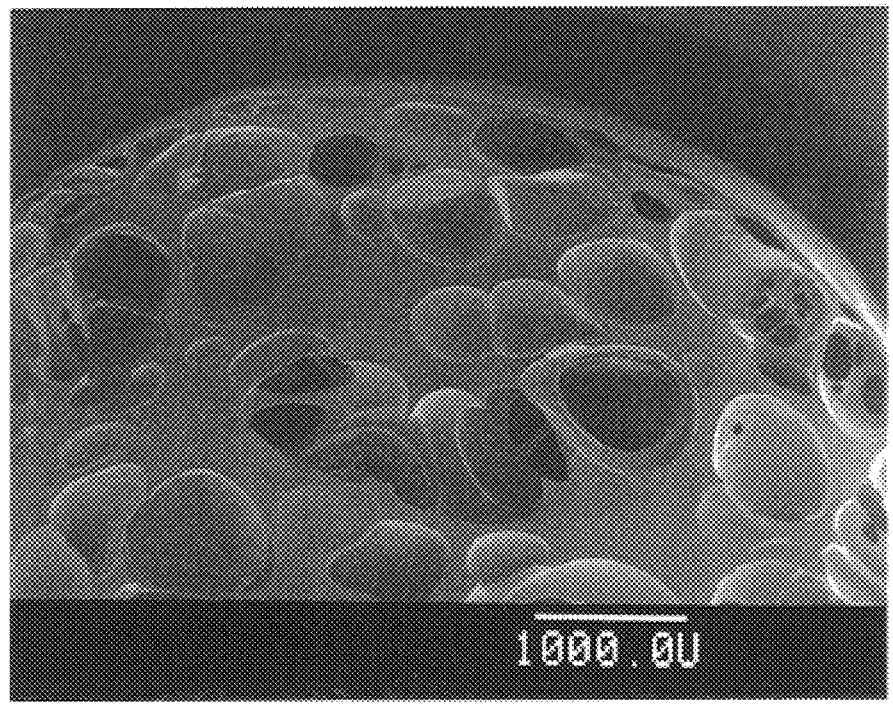
FIG. 1 is a photomicrograph of a foamed homopolymer described in Example 1.

It has been discovered that articles formed from polypropylene polymer foams and desirable polypropylene homopolymer foams, prepared in multistage reactors that exhibit broad molecular weight distribution possess superior bubble control compared to foamed articles formed from traditional polypropylene polymers.

More particularly, the invention relates to an article formed from polypropylene polymer foam. The polypropylene polymer includes an isotactic propylene homopolymer with a molecular weight distribution in the range from 2.5 to 20.0, hexane extractables of less than 1.0 weight percent, a melt flow rate in the range of 0.2 dg/min to 30.0 dg/min and a foam density in the range of from and including 0.1 to and including 1.0 g/cm$^3$. This polypropylene polymer foam may further include a blend of first and second propylene homopolymers. The first propylene homopolymer has a melt flow rate in the range of 0.15 dg/min to 4.0 dg/min and a molecular weight distribution in the range of 1.8 to 2.5. The second propylene homopolymer has a melt flow rate in the range of 5 dg/min to 1000 dg/min and a molecular weight distribution in the range of 1.8 to 2.5. The articles so formed may include containers, automotive bumpers, side panels, floor mats, dashboards, and instrument panels.

A method for forming a foamed article from isotactic polypropylene polymer is provided. The method includes polymerizing propylene in the presence of a metallocene based catalyst, and desirably a single metallocene based catalyst, and a first concentration of chain transfer agent sufficient to produce a first propylene homopolymer having a melt flow rate in the range from 0.15 dg/min to 4.0 dg/min and a molecular weight distribution in the range of 1.8 to 2.5. The first propylene homopolymer and the metallocene based catalyst is homopolymerized with propylene in the presence of a second concentration of chain transfer agent sufficient to produce a second propylene homopolymer having a molecular weight distribution in the range of 1.8 to 2.5 and a melt flow rate in the range from 5 dg/min to 1000 dg. The isotactic polypropylene is a blend of the first and second homopolymer having a molecular weight distribution in the range of from 2.5 to 20 and wherein the first homopolymer includes from 40 weight percent (wt %) to 80 weight percent of the isotactic polypropylene polymer and the second homopolymer includes from 20 weight percent to 60 weight percent of the isotactic polypropylene polymer. The isotactic polypropylene polymer so formed is then processed so that when the isotactic polypropylene polymer is contacted with a foaming agent the foamed article is formed. Desirably, the chain transfer agent in at least one of the steps is hydrogen.

DETAILED DESCRIPTION OF THE INVENTION

Polypropylene Polymer

The polypropylene polymers, and desirably the isotactic polypropylene polymers, include a reactor blend of two or more isotactic propylene homopolymers having differing weight average molecular weights such that the overall polymer has a molecular weight distribution that is in the range of from 2.5 to 20.0, desirably from 2.8 to 12.0, even more desirably from 3.0 to 8.0.

Each isotactic propylene homopolymer desirably has a different melt flow rate. As such, the polypropylene polymer includes one or more isotactic propylene homopolymers having a low melt flow rate, i.e. the low melt flow rate polymer species (in the range of from 0.15 dg/min. to 4.0 dg/min) that was prepared in the low melt flow rate stage and one or more isotactic propylene homopolymers having a high melt flow rate, i.e. the high melt flow rate polymer species (in the range of from 5 dg/min to 1000 dg/min) that was prepared in the high melt flow rate stage. In this way, the polypropylene polymers desirably have a melt flow rate in the range of from 0.2 dg/min to 30 dg/min, desirably from 0.5 dg/min to 20.0 dg/min, even more desirably from 1.0 dg/min to 10.0 dg/min. The melting point of the polypropylene polymer is desirably greater than 145° C., more desirably greater than 150° C., and even more desirably greater than 155° C. Upper limits for melting point depend on the specific application and metallocene used but would typically not be higher than 170° C. The hexane extractables level (as measured by 21 CFR 177.1520(d)(3)(i)) of the polypropylene polymer is desirably less than 2.0 wt %, more desirably less than 1.0 wt %, despite the broad MWD.

The polypropylene polymers of this invention desirably have a weight average molecular weight (MW) that is in the range of from 140,000 to 750,000 more desirably from 150,000 to 500,000, and most desirably from 200,000 to 400,000.

Desirably, the polypropylene polymers include from 40 wt % to 80 wt % of the low melt flow rate polymer species based on the total weight of the polypropylene polymer and from 20 wt % to 60 wt % of the high melt flow rate polymer species based on the total weight of the polypropylene polymer, and more desirably from 55 wt % to 65 wt % of the low melt flow polymer species based on the total weight of the polypropylene polymer and from 35 wt % to 45 wt % of the high melt flow rate species based on the total weight of the polypropylene polymer.

Although the focus here is on homopolymers with a unique combination of molecular weight distribution, good physical properties, and low extractables levels, it will be clear to persons skilled in the art that similarly unique combinations of properties will also be possible with copolymers, where controlled levels of comonomer(s), such as ethylene and alpha olefins, such as for example, 1-butene, 1-pentene, 1-hexene, and 1-octene are additionally employed.

Polypropylene Polymer Polymerization Process

The polypropylene polymer polymerization process involves the use of metallocene catalyst systems that comprise a metallocene component and at least one activator. Desirably, these catalyst system components are supported on support material.

The polypropylene polymers of this invention are generally prepared in a multiple stage process wherein homopolymerization is conducted in each stage separately in parallel or, desirably in series. Individually, each stage may involve any process including gas, slurry or solution phase or high pressure autoclave processes. Desirably, the polypropylene polymer is prepared in a multiple stage, series, slurry loop reactor using propylene as the polymerization diluent. The polymerization is carried out using a pressure of from 200 kPa to 7,000 kPa at a temperature in the range of from 50° C. to 120° C. In each stage, propylene may be homopolymerized with the same catalyst system, which desirably includes a metallocene catalyst, but with a different concentration of chain termination agent in at least two of the stages.

Examples of chain termination agents are those commonly used to terminate chain growth in Ziegler-Natta polymerization, a description of which can be found in ZIEGLER-NATTA CATALYSTS AND POLYMERIZATIONS, pp. 224–260, by John Boor, Jr., (Academic Press, 1979). Hydrogen and diethyl zinc are examples of agents that are very effective in the control of polymer molecular weight in olefin polymerization. Hydrogen is the more desirable agent.

Desirably, the concentration of chain termination agent in one stage is sufficient to produce a propylene homopolymer having a melt flow rate in the range of from 0.15 dg/min. to 4.0 dg/min, desirably from 0.2 dg/min to 2.0 dg/min, even more desirably from 0.2 dg/min to 1.0 dg/min and a molecular weight distribution (Mw/Mn) in the range from 1.8 to 2.5 and desirably from 1.8 to 2.3. Desirably, the concentration of chain termination agent in a separate, either earlier or later stage, is sufficient to produce a propylene homopolymer having a melt flow rate in the range of from 5 dg/min to 1000 dg/min, desirably from 20 dg/min to 200 dg/min and more desirably from 30 dg/min to 100 dg/min and a molecular weight distribution (Mw/Mn) in the range from 1.8 to 2.5 and desirably from 1.8 to 2.3.

Non-limiting examples of metallocenes suitable for use in the homopolymer polymerization process as well as the copolymer polymerization process include:

Dimethylsilandiylbis(2-methyl-4-phenyl-1-indenyl) Zirconium dimethyl;

Dimethylsilandiylbis(2-methyl-4,5-benzoindenyl) Zirconium dimethyl;

Dimethylsilandiylbis(2-methyl-4,6-diisopropylindenyl) Zirconium dimethyl;

Dimethylsilandiylbis(2-ethyl-4-phenyl-1-indenyl) Zirconium dimethyl;

Dimethylsilandiylbis(2-ethyl-4-naphthyl-1-indenyl) Zirconium dimethyl,

Phenyl(methyl)silandiylbis(2-methyl-4-phenyl-1-indenyl) Zirconium dimethyl,

Dimethylsilandiylbis(2-methyl-4-(1-naphthyl)-1-indenyl) Zirconium dimethyl,

Dimethylsilandiylbis(2-methyl-4-(2-naphthyl)-1-indenyl) Zirconium dimethyl,

Dimethylsilandiylbis(2-methyl-indenyl)Zirconium dimethyl,

Dimethylsilandiylbis(2-methyl-4,5-diisopropyl-1-indenyl) Zirconium dimethyl,

Dimethylsilandiylbis(2,4,6-trimethyl-1-indenyl)Zirconium dimethyl,

Phenyl(methyl)silandiylbis(2-methyl-4,6-diisopropyl-1-indenyl)Zirconium dimethyl, 1,2-Ethandiylbis(2-methyl-4,6-diisopropyl-1-indenyl) Zirconium dimethyl, 1,2-Butandiylbis(2-methyl-4,6-diisopropyl-1-indenyl) Zirconium dimethyl, Dimethylsilandiylbis(2-methyl-4-ethyl-1-indenyl) Zirconium dimethyl, Dimethylsilandiylbis(2-methyl-4-isopropyl-1-indenyl) Zirconium dimethyl, Dimethylsilandiylbis(2-methyl-4-t-butyl-1-indenyl) Zirconium dimethyl, Phenyl(methyl)silandiylbis(2-methyl-4-isopropyl-1-indenyl)Zirconium dimethyl, Dimethylsilandiylbis(2-ethyl-4-methyl-1-indenyl) Zirconium dimethyl, Dimethylsilandiylbis(2,4-dimethyl-1-indenyl)Zirconium dimethyl, Dimethylsilandiylbis(2-methyl-4-ethyl-1-indenyl) Zirconium dimethyl, Dimethylsilandiylbis(2-methyl-1-acenaphth-1-indenyl) Zirconium dimethyl, Phenyl(methyl)silandiylbis(2-methyl-4,5-benzo-1-indenyl) Zirconium dimethyl, Phenyl(methyl)silandiylbis(2-methyl-4,5-(methylbenzo)-1-indenyl)Zirconium dimethyl,
Phenyl(methyl)silandiylbis(2-methyl-4,5-(tetramethylbenzo)-1-indenyl)Zirconium dimethyl,
Phenyl(methyl)silandiylbis(2-methyl-a-acenaphth-1-indenyl)Zirconium dimethyl,
1,2-Ethandiylbis(2-methyl-4,5-benzo-1-indenyl)Zirconium dimethyl,
1,2-Butandiylbis(2-methyl-4,5-benzo-1-indenyl)Zirconium dimethyl,
Dimethylsilandiylbis(2-methyl-4,5-benzo-1-indenyl)Zirconium dimethyl,
1,2-Ethandiylbis(2,4,7-trimethyl-1-indenyl)Zirconium dimethyl,
Dimethylsilandiylbis(2-methyl-1-indenyl)Zirconium dimethyl,
1,2-Ethandiylbis(2-methyl-1-indenyl)Zirconium dimethyl,
Phenyl(methyl)silandiylbis(2-methyl-1-indenyl)Zirconium dimethyl,
Diphenylsilandiylbis(2-methyl-1-indenyl)Zirconium dimethyl,
1,2-Butandiylbis(2-methyl-1-indenyl)Zirconium dimethyl,
Dimethylsilandiylbis(2-ethyl-1-indenyl)Zirconium dimethyl,
Dimethylsilandiylbis(2-methyl-5-isobutyl-1-indenyl)Zirconium dimethyl,
Phenyl(methyl)silandiylbis(2-methyl-5-isobutyl-1-indenyl)Zirconium dimethyl,
Dimethylsilandiylbis(2-methyl-5-t-butyl-1-indenyl)Zirconium dimethyl,
Dimethylsilandiylbis(2,5,6-trimethyl-1-indenyl)Zirconium dimethyl,
Dimethylsilandiylbis(2-methyl-4-phenyl-1-indenyl)Zirconium dichloride
Dimethylsilandiylbis(2-methyl-4,5-benzoindenyl)Zirconium dichloride,
Dimethylsilandiylbis(2-methyl-4,6-diisopropylindenyl)Zirconium dichloride,
Dimethylsilandiylbis(2-ethyl-4-phenyl-1-indenyl)Zirconium dichloride,
Dimethylsilandiylbis(2-ethyl-4-naphthyl-1-indenyl)Zirconium dichloride,
Phenyl(methyl)silandiylbis(2-methyl-4-phenyl-1-indenyl)Zirconium dichloride,
Dimethylsilandiylbis(2-methyl-4-(1-naphthyl)-1-indenyl)Zirconium dichloride,
Dimethylsilandiylbis(2-methyl-4-(2-naphthyl)-1-indenyl)Zirconium dichloride,
Dimethylsilandiylbis(2-methyl-indenyl)Zirconium dichloride,
Dimethylsilandiylbis(2-methyl-4,5-diisopropyl-1-indenyl)Zirconium dichloride,
Dimethylsilandiylbis(2,4,6-trimethyl-1-indenyl)Zirconium dichloride,
Phenyl(methyl)silandiylbis(2-methyl-4,6-diisopropyl-1-indenyl)Zirconium dichloride,
1,2-Ethandiylbis(2-methyl-4,6-diisopropyl-1-indenyl)Zirconium dichloride,
1,2-Butandiylbis(2-methyl-4,6-diisopropyl-1-indenyl)Zirconium dichloride,
Dimethylsilandiylbis(2-methyl-4-ethyl-1-indenyl)Zirconium dichloride,
Dimethylsilandiylbis(2-methyl-4-isopropyl-1-indenyl)Zirconium dichloride,
Dimethylsilandiylbis(2-methyl-4-t-butyl-1-indenyl)Zirconium dichloride,
Phenyl(methyl)silandiylbis(2-methyl-4-isopropyl-1-indenyl)Zirconium dichloride,
Dimethylsilandiylbis(2-ethyl-4-methyl-1-indenyl)Zirconium dichloride,
Dimethylsilandiylbis(2,4-dimethyl-1-indenyl)Zirconium dichloride,
Dimethylsilandiylbis(2-methyl-4-ethyl-1-indenyl)Zirconium dichloride,
Dimethylsilandiylbis(2-methyl-α-acenaphth-1-indenyl)Zirconium dichloride,
Phenyl(methyl)silandiylbis(2-methyl-4,5-benzo-1-indenyl)Zirconium dichloride,
Phenyl(methyl)silandiylbis(2-methyl-4,5-(methylbenzo)-1-indenyl)Zirconium dichloride,
Phenyl(methyl)silandiylbis(2-methyl-4,5-(tetramethylbenzo)-1-indenyl)Zirconium dichloride,
Phenyl(methyl)silandiylbis(2-methyl-a-acenaphth-1-indenyl)Zirconium dichloride,
1,2-Ethandiylbis(2-methyl-4,5-benzo-1-indenyl)Zirconium dichloride,
1,2-Butandiylbis(2-methyl-4,5-benzo-1-indenyl)Zirconium dichloride,
Dimethylsilandiylbis(2-methyl-4,5-benzo-1-indenyl)Zirconium dichloride,
1,2-Ethandiylbis(2,4,7-trimethyl-1-indenyl)Zirconium dichloride,
Dimethylsilandiylbis(2-methyl-1-indenyl)Zirconium dichloride,
1,2-Ethandiylbis(2-methyl-1-indenyl)Zirconium dichloride,
Phenyl(methyl)silandiylbis(2-methyl-1-indenyl)Zirconium dichloride,
Diphenylsilandiylbis(2-methyl-1-indenyl)Zirconium dichloride,
1,2-Butandiylbis(2-methyl-1-indenyl)Zirconium dichloride,
Dimethylsilandiylbis(2-ethyl-1-indenyl)Zirconium dichloride,
Dimethylsilandiylbis(2-methyl-5-isobutyl-1-indenyl)Zirconium dichloride,
Phenyl(methyl)silandiylbis(2-methyl-5-isobutyl-1-indenyl)Zirconium dichloride,
Dimethylsilandiylbis(2-methyl-5-t-butyl-1-indenyl)Zirconium dichloride,
Dimethylsilandiylbis(2,5,6-trimethyl-1-indenyl)Zirconium dichloride,
and the like.

Many of these desirable transition metal compound components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970 all of which are herein fully incorporated by reference.

Additionally, metallocenes such as those described in U.S. Pat. Nos. 5,510,502, 4,931,417, 5,532,396, 5,543,373, WO 98/014585, EP611 773 and WO 98/22486 (each fully incorporated herein by reference) are suitable for use in this invention.

The above polymer and polymerization process are further described in U.S. patent application Ser. No. 09/293,656 filed Apr. 16, 1999 which is incorporated in its entirety by reference herein.

Activators

Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain 5 to 40 of the repeating units:

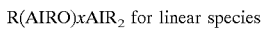
R(AlRO)xAlR$_2$ for linear species and

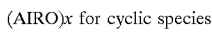
(AlRO)x for cyclic species where R is a $C_1$–$C_8$ alkyl including mixed alkyls. Particularly desirable are the compounds in which R is methyl or other lower alkyls such as $C_3$–$C_8$, now commercial sold by AKZO as "modified Alumoxane". Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1-0 279 586, EP-A-0 594-218 and WO 94/10180, each fully incorporated herein by reference. (As used herein unless otherwise stated "solution" refers to any liquid containing mixture including suspensions.)

Discrete ionizing activators may also be used to activate metallocenes. These activators are neutral or ionic, or are compounds such as tri(n-butyl)ammonium tetrakis (pentaflurophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris (pentafluorophenyl) borane. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. No. 5,643,847, U.S. patent application Ser. No. 09/184,358, filed Nov. 2, 1998 U.S. Pat. No. 6,228,295 and U.S. patent application Ser. No. 09/184,389, filed Nov. 2, 1998 U.S. Pat. No. 6,143,686 (all fully incorporated herein by reference).

When the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Support Materials

The catalyst systems used in the process of this invention are desirably supported using a porous particulate material, such as for example, talc, inorganic oxides, inorganic chlorides and resinous materials such as polyolefin or polymeric compounds.

Desirably, the support materials are porous inorganic oxide materials, which include those from the Periodic Table of Elements of Groups 2, 3, 4, 5, 13 or 14 metal oxides. Silica, alumina, silica-alumina, and mixtures thereof are particularly desirable. Other inorganic oxides that may be employed either alone or in combination with the silica, alumina or silica-alumina are magnesia, titania, zirconia, and the like.

Desirably the support material is porous silica which has a surface area in the range of from 10 to 700 m$^2$/g, a total pore volume in the range of from 0.1 to 4.0 cc/g and an average particle size in the range of from 10 to 500 μm. More desirably, the surface area is in the range of from 50 to 500 m$^2$/g, the pore volume is in the range of from 0.5 to 3.5 cc/g and the average particle size is in the range of from 20 to 200 μm. Most desirably the surface area is in the range of from 100 to 400 m$^2$/g, the pore volume is in the range of from 0.8 to 3.0 cc/g and the average particle size is in the range of from 30 to 100 μm. The average pore size of typical porous support materials is in the range of from 10 to 1000 Å. Desirably, a support material is used that has an average pore diameter of from 50 to 500 Å, and most desirably from 75 to 350 Å. It may be particularly desirable to dehydrate the silica at a temperature of from 100° C. to 800° C. anywhere from 3 to 24 hours.

The metallocenes, activator and support material may be combined in any number of ways. Suitable support techniques are described in U.S. Pat. Nos. 4,808,561 and 4,701,432 (each fully incorporated herein by reference.). Desirably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be pre-activated separately and then combined with the support material either separately or together. If the metallocenes are separately supported, then desirably, they are dried then combined as a powder before use in polymerization.

Regardless of whether the metallocenes and their activator are separately precontacted or whether the metallocenes and activator are combined at once, the total volume of reaction solution applied to porous support is desirably less than 4 times the total pore volume of the porous support, more desirably less than 3 times the total pore volume of the porous support and even more desirably in the range of from more than 1 to less than 2.5 times the total pore volume of the porous support. Procedures for measuring the total pore volume of porous support are well known in the art. One such method is described in Volume 1, Experimental Methods in Catalyst Research, Academic Press, 1968, pages 67–96. Methods of supporting ionic catalysts comprising metallocene cations and noncoordinating anions are described in WO 91/09882, WO 94/03506, U.S. Pat. No. 5,072,823, WO 96/04319 and WO 95/06343, all of which are incorporated herein by reference. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Additives

Additives may be included in the polypropylene polymers of this invention. Such additives and their use are generally well known in the art. These include those commonly employed with plastics such as heat stabilizers or antioxidants, plasticizers, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application.

Foaming Agents

Foaming agents or additives may generally be divided into two classes: physical foaming agents and chemical foaming agents.

Physical foaming or blowing agents are generally gases such as carbon dioxide or nitrogen. Hydrocarbon gases, such as butane or pentane and fluorocarbon gases, such as trichlorofluromethane and dichlorodifluromethane are effective as physical blowing agents producing good quality foams. Because hydrocarbon and flurocarbon gases are viewed as presenting certain health and environmental concerns, the use of these gases is generally not the most desirable. More desirable physical blowing agents are carbon dioxide, nitrogen and argon. Physical blowing agents are utilized when low foam densities (<0.5 g/cm$^3$) are required.

Chemical blowing agents allow the production of foamed produces having a density of generally greater than 0.5 g/cm$^3$. Examples of chemical blowing agents include bicarbonate of soda (used typically in combination with citric acid), azodicarbonamide, sulfonyl hydrazide, sulfonyl semicarbazide. Bicarbonate of soda (endothermic agent) and azodicarbonamide (exothermic agent) are perhaps the most widely used chemical blowing agents.

When used at low levels, generally less than 1 wt %, and desirably around 0.25 wt % based on the weight of the polymer being foamed, chemical blowing agents may function as bubble nucleating agents and facilitate the formation of more uniformly sized bubble. This function is often utilized even when the primary foaming medium is a physical blowing agent, such as carbon dioxide gas. Talc can also be utilized for bubble nucleation.

The resulting foamed articles made from these multistage processes have a more uniform foam cell morphology and good extrudate skin surface. More particularly, the foamable polypropylene polymers of the present invention are useful in applications such as, for example, sheet extrusion and molded articles, such as molded automotive parts. In those instances where the application is sheet extrusion, the foamed sheets may be subsequently thermoformed into packaging containers. In those instances where the application is for molded articles, the molded articles may include a variety of molded parts, particularly molded parts related to and used in the automotive industry, such as for example bumpers, side panels, floor mats, dashboards and instrument panels. Examples of other applications for which foamed plastic, such as foamed polypropylene, are useful may be found in Encyclopedia of Chemical Technology, by Kirk-Othmer, Fourth Edition, vol. 11, at pages 730–783, which are incorporated by reference herein.

EXAMPLES

The following example is presented to illustrate the foregoing discussion. Although the example may be directed to certain embodiments of the present invention, it is not to be viewed as limiting the invention in any specific respect. The equipment used and the experimental procedure employed to obtain the data in the following tables are outlined below.

Various foaming tests/trials on polypropylene polymers, were conducted at the Polymer Processing Institute of the New Jersey Institute of Technology, Newark, N.J. A Killion-segmented single screw extruder of 1.25 inch diameter with 40 L/D (length/diameter), equipped with a high-pressure gas injection port located at 19 L/D length, and with a ⅛ inch rod die was used to produce extruded foams via physical blowing agents. Carbon dioxide gas was used typically as blowing agent at various pressures ranging from approximately 250 psi to upwards of 1000 psi. The polymer materials examined were plasticiated within the first 19 diameters of the screw. Beyond the gas injection port, the remaining extruder length was used for gas mixing, compression and cooling of the gas-laden polymer. At the die exit the temperature was approximately 150° C. to 160° C. An auger feeder was used to control the flow of resin to the line. The extrusion line is typically operated in a near starve-fed mode, to optimize residence time and maximize foam formation. Under steady state conditions, the extrudate emerging from the die swells up to a diameter >⅛ inch, reflecting the bubble formation of the gas as it comes out of solution from the extruded polymer melt. Controllable line parameters include the temperature profile settings (feed section through to the die), the extruder speed and the speed of the auger screw feed, the blowing agent gas flow rate and gas pressure and the die pressure.

Sample 1 (Comparative)

Sample 1 is a commercial Ziegler-Natta-catalyzed, isotactic, homopolypropylene polymer product available from Montell Polyolefins (product number PP 6523) having an MFR around 4. Some of its physical properties are listed in Table 1. (See FIG. 1)

Sample 2 (Invention)

The data for Sample 2 were taken on an isotactic polypropylene homopolymer. This homopolymer was prepared in a manner similar to the homopolymer polymerization process described above.

A catalyst system was prepared involving dimethylsilylbis(2-methyl-4-phenyl-indenyl)zirconium dichloride metallocene, methylalumoxane (in toluene) as activator, styrene as modifier and Davison XPO 2407 silica (W. R. Grace, Davision Chemical Division, Baltimore, Md.) as support material. The catalyst preparation procedure is described in U.S. Ser. No. 09/293,656 which is incorporated by reference herein. Specific catalyst formulation details for the catalyst system prepared, are as follows:

| | |
|---|---|
| Zr loading (mmole/g $SiO_2$) | 0.028 |
| Al loading (mmole/g $SiO_2$) | 2.9 |
| Ztyrene/Zr loading | 5.7 |

Several batches of the catalyst system were combined to provide the charge for the polymerization run. The catalyst system was oil slurried with Drakeol™ white mineral oil (Witco Chemical) for ease of addition to the reactor.

The polymerization was conducted in a pilot scale, two reactor, continuous, stirred tank, bulk liquid phase process. The reactors were equipped with jackets for removing the heat of polymerization. The reactor temperatures were 70° C. in the first reactor and 64.5° C. in the second reactor. Catalyst was fed at a rate of 5.2 g/hr. TEAL (2.0 wt % in hexane) was used as a scavenger and added at a rate of 17.3 wppm. The catalyst system prepared above was fed as a 20% slurry in mineral oil and was flushed into the first reactor with propylene. Total propylene monomer feed to the first reactor was 80 Kg/hr . Propylene monomer feed to the second reactor was 30 Kg/hr. Hydrogen was added for molecular weight control at a rate of 530 mppm to the first reactor and 8450 mppm to the second reactor. Reactor residence times were 2.5 hours in the first reactor and 1.8 hours in the second reactor. Polymer production rates were 20 Kg/hr from the first reactor and 11 Kg/hr from the second reactor. 65% of the final polymer product was derived from the first reactor and 35% from the second reactor. Polymer was discharged from the reactors as a granular product having an MFR of 3.6 dl/g. Product produced in the first reactor was estimated to be of 1 MFR and product produced in the second reactor of 78 MFR. Following pelletization of the product with stabilizers, the pellet MFR was 1.8.

TABLE 1

| Physical Property | Sample 1 | Sample 2 |
|---|---|---|
| MFR (dg/min on pellets) | 4 | 1–8 |
| Mw | 360 k | 392 k |
| Mz | 1050 k | 870 k |
| MWD (Mw/Mn) | 5.4 | 8.3 |
| Young's modulus | 53,000 psi | 66,000 psi |
| Yield Stress | 4200 psi | 4900 psi |
| Elongation at Break | 940% | 760% |
| Tm | 162.3° C. | 153.1° C. |
| Tc | 114.2° C. | 120.0° C. |
| Heat of Fusion | 111.2 J/g | 108.0 J/g |
| Foasm Density | 0.7 g/cm3 | 0.3–0.7 g/cm3 |

Table 1 Notes: Molecular weight are via standard GPC procedures polypropylene polymer Tensile properties are via Instron testing at room temperature at 2 in/min (equivalent to ASTM method D-524)
Tm, Tc and Heat of Fusion are from standard DSC procedures using a 10° C./min heating and cooling rate.

Results

Experimentation on the two samples revealed clear and distinct advantages in favor of Sample 1. These advantages were primarily in the area of foam production and in the quality of the final foamed product.

More specifically, it was observed that at generally any given gas pressure foam formation via the described process was much easier during the foaming of Sample 2 as compared to Sample 1. For instance, during the foaming of Sample 1, excessive bubble collapse was observed in the gas pressure ranges of 250 to 750 psi. Additionally, the final foamed Sample 1 product possessed undesirable large bubbles and a poor texture as illustrated in FIG. 1. The presence of large bubbles generally reduces the structural integrity of the final foamed product and the lack of bubble uniformity generally results in a final product having a rough or coarse surface. Reduced structural integrity and coarse surfaces are undesirable characteristics in a foamed article. It was also observed, in the case of Sample 1, that the extrudate spiraled excessively and coiled at the die exit due to bubble bursting. This illustrates poor/undesirable processability and bubble control. The density of the foamed product (see Table 1) of Sample 1 was comparatively higher than that of inventive Sample 2, under similar foaming conditions.

Figure 2:
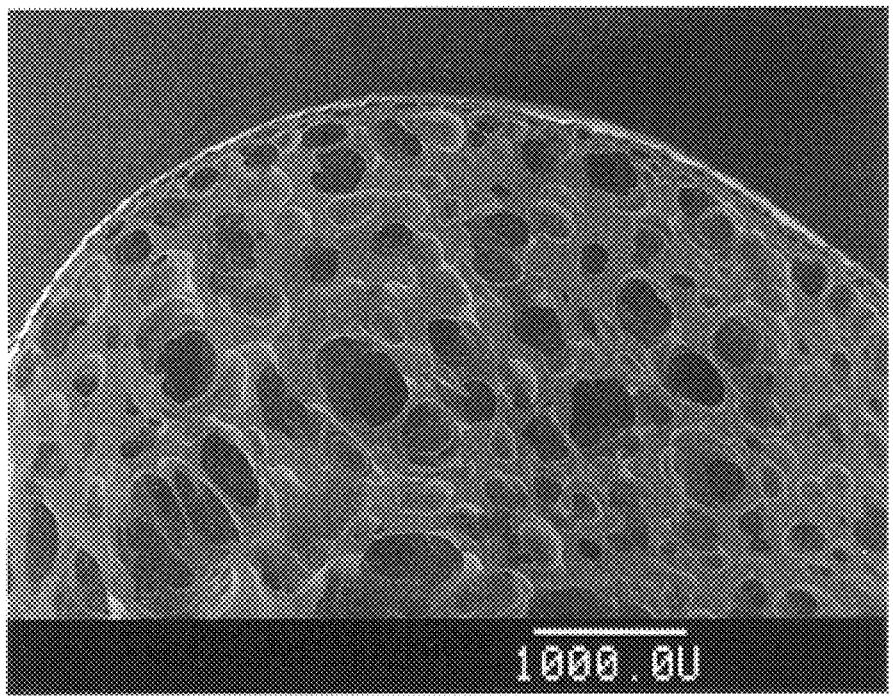
FIG. 2 is a photomicrograph of a foamed homopolymer of the present invention described in Example 2.

In contrast to Sample 1, as illustrated in FIG. 1, Sample 2 exhibited a wider foam processing window. As illustrated in FIG. 2, the texture of the final foamed product was smoother, reflecting the more uniformly sized bubble, which is desirable. The cell structure showed little, if any, bursting of cells upon exiting the extruder die. Foams of a broader density range (see Table 1) down to 0.3 g/cm$^3$ could be made with Sample 2.

It should be noted that the final value of foamed density is generally dependent on the equipment used. To achieve low levels (<0.5 g/cm$^3$) of foamed density, physical blowing agents are usually employed. The attainment of very low foamed densities (<0.1 g/cm$^3$) is generally performed on lines employing tandem extruders, where the focus in the second extruder is primarily optimum mixing and dissolution of the gas and effective cooling of the polymer/gas mixture, prior to cell formation when the extrudate leaves the die. The fact that inventive Sample 2 provided a lower foam density than the standard Ziegler-Natta homopolypropylene Sample 1, under the same foam fabrication set-up and conditions, reflects the benefits of the product tailoring described earlier. Furthermore, tandem extrusion of the inventive polymer may enable foamed articles having densities as low as 0.1 g/cm$^3$. Among the other areas, the benefits provided by the inventive polymer are believed to be improved gas solubility and diffusion, which are desirable parameters for producing quality foamed products.

While carbon dioxide was used as the foaming agent in the present case, other gases, such as heptane, nitrogen, helium, butane, isobutane and isopentane may also be used to foam polymers of this invention.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. An article of manufacture comprising a polypropylene polymer foam comprising:
   isotactic propylene homopolymer with a molecular weight distribution in the range from 2.5 to 20.0, hexane extractables of less than 1.0 weight percent, a melt flow rate in the range of 0.2 dg/min to 30.0 dg/min and wherein the polypropylene polymer foam has a density in the range of from 0.3 to 1.0 g/cm$^3$ and
   wherein the isotatic propylene homopolymer comprises a blend of first and second propylene homopolymers, wherein the first propylene homopolymer has a melt flow rate in the range of 0.15 dg/min to 4.0 dg/min and a molecular weight distribution in the range of 1.8 to 2.5, and wherein the second propylene homopolymer has a melt flow rate in the range of 5 dg/min to 1000 dg/min and a molecular weight distribution in the range of 1.8 to 2.5.

2. The article of claim 1 wherein the isotactic propylene homopolymer comprises from 40 wt % to 80 wt % of the first propylene homopolymer based on the total weight of the polypropylene polymer.

3. The article of claim 1 wherein the isotactic propylene homopolymer further comprises from 55 wt % to 65 wt % of the first propylene homopolymer based on the total weight of the polypropylene polymer.

4. The article of claim 1 wherein the molecular weight distribution of the first and second propylene homopolymer is in a range of 1.8 to 2.3.

5. The article of claim 1 wherein the melt flow rate of the first propylene homopolymer is in a range of 0.2 dg/min to 2.0 dg/min and the melt flow rate of the second propylene homopolymer is in a range of 30 dg/min to 100 dg/min.

6. The article of claim 1 selected from a group that includes a bumper, side panel, floor mat, dashboard, instrument panel, and container.

7. An article of manufacture comprising a polypropylene polymer foam having a density in the range of from 0.3 to 1.0 g/cm$^3$ comprising: isotactic propylene homopolymer with a molecular weight distribution in the range from 2.5 to 20.0, hexane extractables of less than 1.0 weight percent, a melting point greater than 145° C., and a melt flow rate in the range of 0.2 dg/min to 30.0 dg/min, wherein the isotactic propylene homopolymer further comprises a blend of first and second propylene homopolymers, wherein the first propylene homopolymer has a melt flow rate in the range of 0.15 dg/min to 4.0 dg/min and a molecular weight distribution in the range of 1.8 to 2.5 and comprises from 40 percent to 80 percent of the isotactic propylene homopolymer, and wherein the second propylene homopolymer has a melt flow rate in the range of 5 dg/min to 1000 dg/min and a molecular weight distribution in the range of 1.8 to 2.5 and comprises from 20 percent to 60 percent of the isotactic propylene homopolymer.

8. The article of claim 7 wherein the isotactic propylene homopolymer of claim 7 comprises from 55 wt % to 65 wt % of the first propylene homopolymer based on the total weight of the isotactic propylene homopolymer.

9. The article of claim 7 wherein the isotactic propylene homopolymer comprises from 35 wt % to 55 wt % of the second propylene homopolymer based on the total weight of the isotactic propylene homopolymer.

10. The article of claim 7 wherein the molecular weight distribution of the first and second propylene homopolymer is in a range of 1.8 to 2.3.

11. The article of claim 7 wherein the melt flow rate of the first propylene homopolymer is in a range of 0.2 dg/min to 2.0 dg/min and the melt flow rate of the second propylene homopolymer is in a range of 30 dg/min to 100 dg/min.

12. The article of claim 7 selected from the group including a bumper, side panel, floor mat, dashboard, instrument panel, and container.

* * * * *